US008612068B2

(12) United States Patent
Patera

(10) Patent No.: US 8,612,068 B2
(45) Date of Patent: Dec. 17, 2013

(54) APPARATUS AND METHOD FOR PROPAGATING THE ATTITUDE OF A VEHICLE

(75) Inventor: Russell P Patera, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 243 days.

(21) Appl. No.: 13/198,598

(22) Filed: Aug. 4, 2011

(65) Prior Publication Data
US 2013/0035803 A1  Feb. 7, 2013

(51) Int. Cl.
G05D 1/00 (2006.01)
G05D 1/08 (2006.01)
G05D 3/00 (2006.01)
G06F 17/00 (2006.01)

(52) U.S. Cl.
USPC .............. 701/4; 701/3; 701/5; 701/6; 701/13; 701/1

(58) Field of Classification Search
None
See application file for complete search history.

(56) References Cited

PUBLICATIONS

Lu et al., Nonlinear Quaternion Feedback Control for Spacecraft via Angular Velocity Shaping, Jun. 1994, American Control Conference, pp. 632-636.*
"Attitude Propagation for a Slewing Angular Rate Vector"; Author: Russell P. Patera; Publication Date: Nov.-Dec. 2010: Journal of Guidance, Control and Dynamics.

* cited by examiner

Primary Examiner — Bhavesh V Amin
(74) Attorney, Agent, or Firm — Leonardpatel PC

(57) ABSTRACT

Apparatus and method is provided for propagating the attitude of a vehicle. A slew rate is computed based on angular rotation increments associated with a time interval. An incremental update is computed for the associated time interval based on an angular rate and the slew rate. An attitude of the vehicle is propagated based on the computed attitude increment and an initial attitude at the start of propagation.

20 Claims, 9 Drawing Sheets

APPARATUS AND METHOD FOR PROPAGATING THE ATTITUDE OF A VEHICLE

FIELD

The present invention relates to an apparatus and method for propagating the attitude of a vehicle and, more particularly, to propagating the attitude of a vehicle that uses sensors to measure the vehicle's angular rate.

BACKGROUND

Generally, a launch vehicle or satellite includes sensors that compute or measure the angular rate as the vehicle is flying. For instance, inertial measurement units (IMU) located on the vehicle process the data received from gyros. In particular, the IMU performs an integration of the angular rate and outputs angular increments. The angular increments are processed and used to determine the angular attitude.

When the vehicle travels through, for example, the atmosphere, the vehicle undergoes a vibration and the vibration causes an error in the attitude propagation (i.e., coning error). Accordingly, coning correction algorithms are used by the flight computer in an attempt to correct the coning error. However, the coning correction algorithms lack accuracy with respect to pure coning motion.

For example, current attitude update algorithms use a rotation vector differential equation driven by incremental rotation vectors provided by the IMU. Noncommutativity of the incremental rotation vectors can introduce attitude propagation error. Coning correction algorithms are used to reduce such attitude propagation errors. The coning correction algorithms are calibrated for the case of pure coning motion, since this motion tends to generate the greatest attitude error growth rate.

The attitude of a vehicle can be specified by a transformation matrix, U, from the vehicle's coordinate frame to inertial reference coordinates. If $x_B$ is a vector in the vehicle body frame, the vector in the vehicle body frame transforms to the inertial frame by the transformation $$x_I = U x_B \tag{1}$$

where U is the direction cosine transformation matrix and $x_I$ is the vector in the inertial frame.

$$U = \begin{pmatrix} 1+(e_3^2+e_2^2)C & -(e_1e_2C+e_3S) & e_2S-e_1e_3C \\ e_3S-e_1e_2C & 1+(e_1^2+e_3^2)C & -(e_3e_2C+e_1S) \\ -(e_3e_1C+e_2S) & e_1S-e_2e_3C & 1+(e_1^2+e_2^2)C \end{pmatrix} \tag{2}$$

e is a unit vector in the direction of an axis of rotation known as the Euler axis and θ is the angle of rotation about the Euler axis, $C=\cos(\theta)-1$, and $S=\sin(\theta)$. Euler's rotation theorem states that any transformation between two coordinate frames can be represented by a single rotation of angle θ about the Euler rotation axis. Thus, an Euler rotation vector θ can be defined to represent an arbitrary transformation where $$\theta = \theta e_1 + \theta e_2 + \theta e_3 \tag{3}$$

Given the Euler rotation vector as in equation (3), U can be obtained via equation (2).

An incremental attitude transformation matrix associated with an incremental rotation vector is obtained using equation (2). Thus, the attitude can be updated from time T to T+ΔT using equation (4)

$$U_{T+\Delta T} = U_T U(\Delta\theta) \tag{4}$$

where Δθ is the incremental rotation vector associated with time increment ΔT. Equation (4) can be used repeatedly to update the attitude for each successive time increment. The problem then is in determining each attitude update U(Δθ) or, basically, each incremental rotation vector Δθ, since equation (2) is used in each case. Current methods to compute the incremental rotation vector Δθ use a differential equation for the Euler rotation vector as given by $$\dot{\theta} = +1/2(\theta \times \omega) + \frac{1}{\theta^2}\left(1 - \frac{\theta \sin(\theta)}{2(1-\cos(\theta))}\right)\theta \times (\theta \times \omega) \tag{5}$$

The last two terms on the right hand side of equation (5) involve changes in direction of the angular rate vector. The last term on the right hand side is generally neglected, since it is very small. The second term on the right hand side represents the coning correction. Various coning correction algorithms have been developed to compute the coning correction term numerically. For example, three successive incremental rotation vectors are used to perform the coning correction term over a three increment duration as given by $$\int_0^{3\Delta T} 1/2(\theta \times \omega) dt = (c_1 \Delta\theta_1 + c_2 \Delta\theta_2) \times \Delta\theta_3 \tag{6}$$

where coefficients $c_1$ and $c_2$ are found to be 9/20 and 27/20, respectively, by minimizing error for the case of pure coning motion, which has a known solution. Higher order coning correction algorithms use more incremental rotation vectors.

Coning correction algorithms reduce the drift rate error in pure coning motion. The uncompensated drift rate is given by equation (7), where α is the coning rate and φ is the tilt angle.

$$D = \left(\frac{\sin^2(\phi)\alpha}{2}\right)\left(1 - \frac{\sin(\alpha \Delta t)}{\alpha \Delta t}\right) \tag{7}$$

The coning correction algorithm of equation (6) reduces the z-axis drift rate D from that of equation (7) to $$D_c = \frac{\sin^2(\phi)\alpha^7(\Delta t)^6}{204120} \tag{8}$$

Higher order coning correction algorithms use more time increments Δt and reduce the coning error further.

Equations (5) and (6) are used to determine the rotation increment Δθ over the update interval. In equation (6), the update time interval involves three time increments Δt. Coning correction algorithms that use more rotation increments have correspondingly longer update time intervals. Once the rotation increment Δθ for the update interval is determined, the rotation increment is used in equation (4) to update the attitude transformation matrix. The process is repeated as more rotation increments are provided by the vehicle's IMU.

The method described above may be referred to as a "coning correction algorithm." However, it should be appreciated that coning correction algorithms, such as the one described above, may still have errors for the case of pure coning motion.

SUMMARY

Certain embodiments of the present invention may provide solutions to the problems and needs in the art that have not yet been fully identified, appreciated, or solved by current coning correction apparatuses and methods. For example, the embodiments described herein pertain to an apparatus and method that eliminates the accuracy problems (or eliminates the error) with respect to pure coning motion. In other words, the apparatus and method allows coning correction algorithms to be eliminated by using the attitude update method (or algorithm) described herein.

In accordance with an embodiment of the present invention, a method is provided. The method includes computing a slew rate based on angular rotation increments associated with a time interval, and computing an incremental update for the time interval based on an angular rate and the slew rate. The method also includes propagating an attitude based on the computed attitude increment and an initial attitude at the start of propagation.

In accordance with another embodiment of the present invention, an apparatus is provided. The apparatus includes a processor and memory that includes instructions. The instructions are configured to cause the processor to compute a slew rate based on angular rotation increments associated with a time interval, and compute an incremental update for the time interval based on an angular rate and the slew rate. The instructions are further configured to cause the processor to propagate an attitude based on the computed attitude increment and an initial attitude at the start of propagation.

In yet another embodiment of the present invention, a computer program is provided. The computer program is embodied on a non-transitory computer-readable medium. The computer program causes a processor to compute a slew rate based on angular rotation increments associated with a time interval, and compute an incremental update for the time interval based on an angular rate and the slew rate. The computer program is further configured to cause the processor to propagate an attitude based on the computed attitude increment and an initial attitude at the start of propagation.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

The embodiments described herein pertain to an apparatus and method for propagating vehicle attitude using data received from measurements on the vehicle. The apparatus and method eliminate the accuracy problems with respect to pure coning motion, and allow coning correction algorithms to be eliminated by using the attitude update method described herein.

For instance, the attitude update method described in the embodiments below employs an exact analytical solution for pure coning motion. The analytical solution uses the angular rate vector at the beginning of a time interval with the coning or slew rate of the angular rate vector. However, the IMU provides incremental rotation vectors associated with each time interval rather than the angular rate vector itself. A sequence of incremental rotation vectors is received from the IMU to obtain the slew rate of the angular rate vector and the associated instantaneous angular rate at the beginning of each time step. Once the slew rate of the angular rate vector and the angular rates are determined, the attitude update can be determined accurately. For the case of pure coning motion, the attitude update contains no error so that attitude can be propagated with no error other than numerical processing errors, such as round off errors. It should be appreciated that the propagation method can work well for cases other than pure coning motion.

Figure 1:
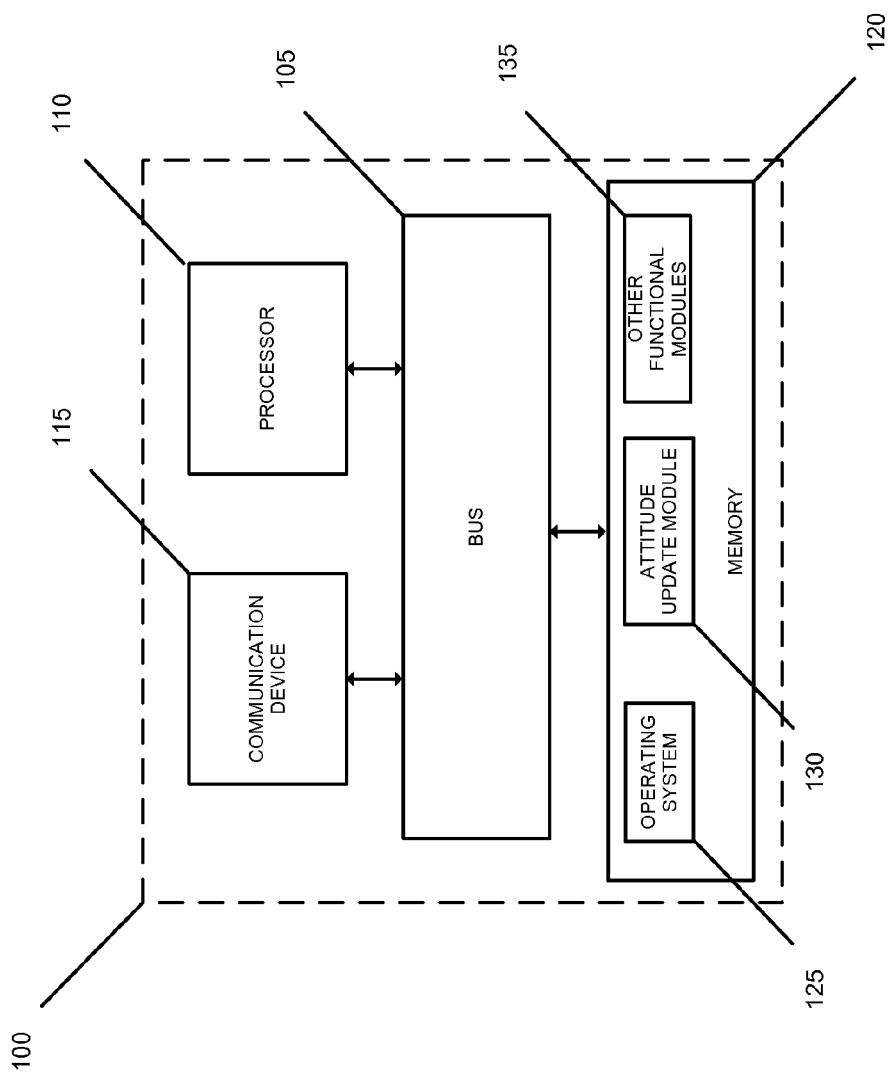
FIG. 1 illustrates a block diagram of a system with an advanced strapdown attitude propagation algorithm that can be implemented in one or more embodiments of the present invention.

FIG. 1 illustrates a block diagram of a system 100 with an advanced strapdown attitude propagation algorithm that can be implemented in one or more embodiments of the present invention. In this embodiment, system 100 can be implemented within a vehicle. The vehicle can be a launch vehicle, satellite, or any type of vehicle or movable object that would be appreciated by a person of ordinary skill in the art.

System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer-readable medium. System 100 may also include a communication device 115, such as a network interface card, that may provide access to a network. Communication device 115 may receive data from the IMU (not shown). For example, the IMU, which is fixed to the body of the vehicle, measures the vehicle's angular rates, and outputs a data, such as a sequence of incremental rotation vectors that correspond to the integral of the angular rate vector over a corresponding sequence of incremental time steps. The data allows an attitude update module 130 to calculate the periodic updates to a vehicle's attitude.

The computer-readable medium may be any available media that can be accessed by processor 110. The computer-readable medium may include both volatile and nonvolatile medium, removable and non-removable media, and communication media. The communication media may include computer-readable instructions, data structures, program modules, or other data and may include any information delivery media.

According to one embodiment, memory 120 may store software modules that may provide functionality when executed by processor 110. The modules can include an operating system 125 and an attitude update module 130, as well as other functional modules 135. Operating system 125 may provide operating system functionality for system 100. Because system 100 may be part of a larger system, system 100 may include one or more additional functional modules 135 to include the additional functionality.

In one embodiment, attitude update module 130 can compute the slew rate of the incremental rotation vectors contained in an update time interval. For instance, if the update interval contains three incremental rotation vectors, the slew rate can be readily computed. The slew rate is then used to compute the angular rate vector at each time increment (e.g., time $t_1, t_2 \ldots t_n$). For each time increment (or time step), the angular increment is replaced with the angular rate vector at the beginning of the time step. The magnitude of the angular rate vector is derived or determined, and a phase shift is performed on the angular rate vector for each time increment. Based on the angular rate vector and the computed slew rate, the attitude can be propagated analytically with no error.

For example, a vehicle angular rate vector of constant magnitude that is slewing at a constant slew rate in the vehicle body frame can be represented by $\alpha$. The time dependent angular rate is given by $$\omega(t)=U(\alpha t)\omega(0) \tag{9}$$

In other words, the angular rate vector $\omega(t)$ that is being measured can be obtained by transforming a vector that is constant, which is $\omega(0)$ (i.e., the initial angular rate vector), and transforming the initial angular rate vector from a slewing frame $\alpha t$ using the transformation matrix U. Thus, equation (9) represents the angular rate vector in the vehicle frame as a vector that is slewing.

It should be appreciated that any vector in the vehicle frame can be transformed to the slewing frame via the coordinate rotation given by $$X_s=U^{-1}(\alpha t)X=U(-\alpha t)X \tag{10}$$

In equation (10), X is an arbitrary vector in the vehicle frame and $X_s$ is a vector in the slewing frame with slew rate $\alpha$. In other words, equation (10) represents a transformation of a vector from the vehicle frame to the slewing frame.

Using equations (9) and (10), the angular rate of the vehicle frame $\omega_v$ can be obtained when the angular rate is transformed to the slewing frame.

$$\omega_v=U(-\alpha t)U(\alpha t)\omega(0)=\omega(0) \tag{11}$$

Therefore, in the slewing frame, the vehicle's angular rate vector remains fixed at its value at time t=0. However, it should be appreciated that the angular rate $\omega$ in equation (11) is not the angular rate of the slewing frame itself, because the slewing frame has an additional angular rate (slew rate) with respect to the vehicle frame given by $\alpha$.

Thus, the slewing frame has an angular rate with respect to the inertial frame given by $$\omega_s=\omega(0)+\alpha \tag{12}$$

In other words, the slewing frame of the angular rate vector, using equation (12), has a constant angular rate given by the initial angular rate $\omega(0)$ in the vehicle frame plus the slew rate $\alpha$. Thus, $\omega_s$ is the angular rate of the slew rate with respect to the inertial frame or the initial frame. Because there is no slew of $\omega_s$, attitude can be propagated with no error.

Therefore, a vector in the slewing frame $X_s$ transforms to a vector in the inertial frame $X_I$ as given by $$X_I=U[\omega(0)t+\alpha t]X_S \tag{13}$$

By using equations (10) and (13), a vector in the vehicle frame can be transformed to the inertial frame by first transforming the vector to the slewing frame, and then transforming the vector from the slewing frame to the inertial frame. The two sequential transformations are given by $$X_I=U[\omega(0)t+\alpha t]U(-\alpha t)X \tag{14}$$

In this equation, the arbitrary vector in the vehicle frame is transformed into the slewing frame, and then the vector in the slewing frame is transformed into the inertial frame to get vector $X_I$ in the inertial frame. If the vehicle has an angular rate of constant magnitude that is slewing at a constant rate with respect to the vehicle frame, attitude can be propagated analytically with no error using two simple rotations as given in equation (14).

In other words, the first step in the process is to determine the slew rate. Once the slew rate is determined, the slew rate is applied to the angular increments that are derived. However, in order to use the method, the angular rate must be known at the beginning of the time step. To determine the angular rate, the magnitude is adjusted for the angular rate vector, and a rotation is performed on the angular rate vector (i.e., rotate the vector by an angle that is half of the angular rotation $\alpha \Delta t/2$).

In an alternative embodiment, a slewing coordinate system can be used when the angular rate of the vehicle is not slewing at a constant rate. For example, the slewing coordinate system can be used for a vehicle with a time-varying angular rate vector $\omega(t)$. In the case of the time-varying angular rate vector, it may be preferable to solve the problem in the slewing frame, which has an angular rate given by $$\omega_S(t)=U[-\beta t]\omega(t)+\beta \tag{15}$$

where $\beta$ is the slew rate of the slewing frame. The attitude transformation from the slewing frame to the inertial frame can be given by $$X_I = U[\theta_S(t)]X_S \tag{16}$$

where $\theta_S$ is the Euler rotation vector associated with $\omega_S$. If the angular rate of the slewing frame undergoes a smaller variation than the angular rate in the vehicle frame, the resulting attitude computation may be more accurate. The attitude solution can be obtained in the slewing frame as $U[\theta_S(t)]$.

It should be appreciated that attitude propagation update module 130 can calculate the transformation from the vehicle frame to the inertial frame relatively easily, because of an additional simple rotation of $-\beta t$, as shown by $$X_I = U[\theta_S(t)]U(-\beta t)X \tag{17}$$

Below is a detailed description to obtain the slew rate for each time step. Attitude update module 130 performs a coordinate transformation method to estimate the slew rate $\alpha$. For instance, three consecutive angular rate vectors (or angular rotation increments) can be used to estimate the slew rate. The first two angular rate increments can be used to define two vectors $v_1$ and $v_2$ in order to define a first coordinate transformation $W_1$.

$$v_1 = \Delta\theta_1 \times \Delta\theta_2 \tag{18}$$

$$v_2 = \Delta\theta_1 \times v_1 \tag{19}$$

After unitizing angular increment $\Delta\theta_1$ and vectors $v_1$ and $v_2$, the first coordinate transformation $W_1$ can be defined as $$W_1 = (\Delta\theta_1 \ v_1 \ v_2) \tag{20}$$

This process is repeated for the second and third angular rate vectors $v_3$ and $v_4$ in order to obtain a second coordinate transformation $W_2$.

$$v_3 = \Delta\theta_2 \times \Delta\theta_3 \tag{21}$$

$$v_4 = \Delta\theta_2 \times v_3 \tag{22}$$

$$W_2 = (\Delta\theta_2 \ v_3 \ v_4) \tag{23}$$

The transformation between the first coordinate transformation $W_1$ and second coordinate transformation $W_2$ is shown by $U(\alpha_1, \Delta t)$ and is obtained using equation (24).

$$U(\alpha_1 \Delta t) = W_2 W_1^{-1} \tag{24}$$

As a result, the slew rate $\alpha_1$ can be obtained from equation (24) and can be used in equation (14) to update the attitude over the associated time interval. The derived slew rate is unique and is assumed to be constant over the associated time interval. A person of ordinary skill in the art will readily appreciate that other methods can be used to determine the slew rate and new methods can be developed. For example, a cross product method, a coordinate transformation method shown in equations (18) to (24), a curve fit method, or any method that would be appreciated by a person of ordinary skill in the art can be used to determine the slew rate. Regardless of the method used to determine the slew rate, the derived slew rate is used in equation (14) to compute the attitude update transformation.

Once the slew rate is estimated, attitude update module 130 determines an instantaneous angular rate by applying the following method to a sequence of incremental rotation vectors.

The method of attitude propagation uses the instantaneous angular rate vector at the beginning of each angular increment $\Delta\theta$ rather than the angular increment $\Delta\theta$ itself. Using a sequence of angular increments $\Delta\theta$, it is possible to determine the slew rate of the angular rate vector and the instantaneous angular rate vector at the beginning of each angular increment $\Delta\theta$. When this is accomplished, vehicle attitude can be propagated very accurately and, in the case of pure coning motion, vehicle attitude can be propagated without error.

As discussed above, the first step is to estimate or determine the slew rate of the angular rate vector. This can be accomplished using the method presented in equations (18) to (24) with a sequence of angular increments $\Delta\theta$ replacing the sequence of instantaneous angular rate vectors. As a result, the slew rate of the angular rate vector remains constant over several time increments.

Figure 2:
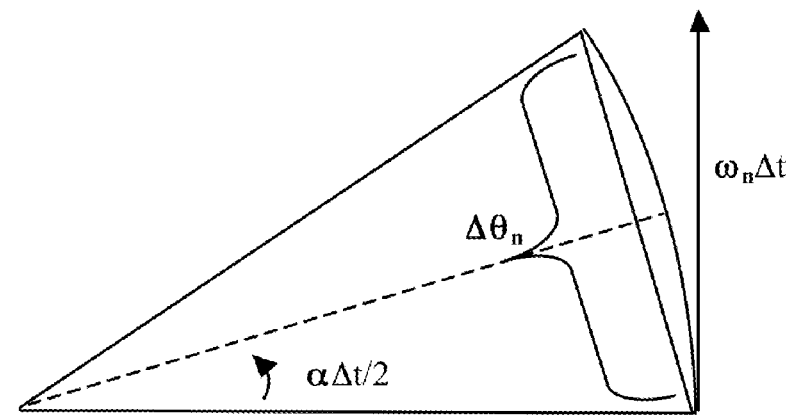
FIG. 2 illustrates a graph that shows a relationship between the rotation increments and a normal component of the instantaneous angular rate, in accordance with one or more embodiments of the present invention.

The component of the angular rate that is parallel to the slew rate $\alpha$ remains constant during the time interval associated with $\Delta\theta_p$. The component of the angular rate that is normal to the slew rate $\alpha$ and rotates about the slew rate $\alpha$ by an angle given by the slew rate of the angular increment $\alpha\Delta t/2$ is shown in FIG. 2. The components of the angular rate that are parallel and normal (or perpendicular) to the slew rate $\alpha$ can be given by equations (25) and (26), respectively.

$$\Delta\theta_p = \left(\frac{\Delta\theta \cdot \alpha}{\alpha \cdot \alpha}\right)\alpha \tag{25}$$

$$\Delta\theta_n = \Delta\theta - \Delta\theta_p \tag{26}$$

The arc length illustrated in FIG. 2 is the magnitude of the angular rate vector multiplied by the time increment $\omega_n \Delta t$. Therefore, the magnitude of the normal component of the angular rate vector $|\omega_n|$ through its relationship with $\Delta\theta_n$ can be obtained by $$|\omega|_n = \frac{|\Delta\theta_n|\alpha}{2\sin(\alpha\Delta t/2)} \tag{27}$$

The direction of the angular rate vector at the beginning of the time interval is the same as the direction of the component of the angular rate that is normal $\Delta\theta_n$ when rotated by the Euler rotation vector $(-\alpha\Delta t/2)$. Equation (28) provides the instantaneous angular rate $\omega$ at the beginning of an angular increment.

$$\omega = \frac{\Delta\theta_p}{\Delta t} + \frac{\Delta\theta_n}{|\Delta\theta_n|}|\omega_n|\cos\left(\frac{-\alpha\Delta t}{2}\right) + |\omega_n|\sin\left(\frac{-\alpha\Delta t}{2}\right)\left(\frac{\alpha \times \Delta\theta_n}{|\alpha \times \Delta\theta_n|}\right) \tag{28}$$

Using the angular rate $\omega$ given by equation (28) and the derived slew rate $\alpha$ given by equation (24), the attitude can be propagated with zero error for the case of pure coning motion using equation (14). It should be appreciated that the above-mentioned method of determining the slew rate and angular rate is performed for each time step, i.e., compute the slew rate and the angular rate vector at the beginning of each time step.

Once the slew rate and the angular rate for each update time interval is computed and used in equation (14), the attitude update module 130 determines the total transformation up to the current time by $$U_t = \Delta U_1 \Delta U_2 \Delta U_3 \Delta U_4 \ldots \Delta U_N \tag{29}$$

where the increments $\Delta U_1$ to $\Delta U_N$ are numbered sequentially. Each increment involves two simple analytical rotations. If the slew rate of the angular rate vector is not known, the slew rate is computed. If the slew rate of the angular rate vector does not change over the N time increments, the attitude can be transformed using only two rotations given by $$U_{t_N} = U\{[\omega(0)+\alpha]t_N\}U(-\alpha t_N) \quad (30)$$

where $t_N$ is the total time duration for the N time increments.

Described below is an example of applying the method for the case of pure coning motion. If the vehicle has an Euler rotation vector $\theta(t)$ given by $$\theta(t) = \begin{pmatrix} \phi\sin(\alpha t) \\ \phi\cos(\alpha t) \\ 0 \end{pmatrix} \quad (31)$$

where $\alpha$ is the slew rate, then the corresponding angular velocity vector $\omega(t)$ can be given by $$\omega(t) = \begin{pmatrix} \alpha\sin(\phi)\cos(\alpha t) \\ -\alpha\sin(\phi)\sin(\alpha t) \\ \alpha(1-\cos(\phi)) \end{pmatrix} \quad (32)$$

The associated transformation matrix (DCM) can be found using equation (31) in equation (2), which can be $$DCM = \begin{pmatrix} \cos(\phi)+(1-\cos(\phi))\sin^2(\alpha t) & 0.5(1-\cos(\phi))\sin(2\alpha t) & \sin(\phi)\cos(\alpha t) \\ 0.5(1-\cos(\phi))\sin(2\alpha t) & \cos(\phi)+(1-\cos(\phi))\cos^2(\alpha t) & -\sin(\phi)\sin(\alpha t) \\ -\sin(\phi)\cos(\alpha t) & \sin(\phi)\sin(\alpha t) & \cos(\phi) \end{pmatrix} \quad (33)$$

In other words, equations (32) and (33) generate the angular rate and the attitude for pure coning motion. The numerical values can then be processed to determine the slew rate using the coordinate transformation method. The attitude can be computed using equation (14) and found to agree with the results using equation (33). Since this case involves pure coning motion, the attitude can be propagated using two rotations regardless of the propagation time.

In one embodiment, delta thetas and the corresponding vehicle attitude can be generated for the case of pure coning motion. For example, equation (32) can be used in equation (34) to obtain the delta thetas analytically as given by $$\int_{t_i}^{t_i+\Delta t} \omega(t)dt = \begin{pmatrix} \sin(\phi)\{\sin[\alpha(t_i+\Delta t)]-\sin(\alpha t_i)\} \\ \sin(\phi)\{\cos[\alpha(t_i+\Delta t)]-\cos(\alpha t_i)\} \\ \alpha[1-\cos(\phi)]\Delta t \end{pmatrix} \quad (34)$$

Equation (34) can be used to compute a delta theta for each time increment. In other words, equation (34) shows how the angular rate vector is related to angular increments. Because the rate gyros may not give the angular rate vectors but may provide angular increments, equation (34) can use an integral from time $t_i$ to time increment $t_i+\Delta t$ to obtain the angular rate increments from the angular rate vector. Module 130 can utilize the angular rate increments over time steps and perform the operations described above to propagate the attitude. The results of the algorithm can be shown in Table 1.

It should be appreciated that the corresponding vehicle attitude for each delta theta can also be obtained using equation (31).

| Measurement Frequency, Hz | Update Frequency, Hz | Uncompensated Drift Rate, degrees/hour | Coning Correction Drift Rate, degrees/hour | Method Drift Rate, degrees/hour |
|---|---|---|---|---|
| 300 | 100 | 39478 | 372 | $-2.28 \times 10^{-9}$ |
| 450 | 150 | 23154 | 32.6 | $-6.9 \times 10^{-9}$ |
| 600 | 200 | 14346 | 5.81 | $-8.02 \times 10^{-9}$ |
| 750 | 250 | 9600 | 1.52 | $4.94 \times 10^{-9}$ |
| 900 | 300 | 6830 | 0.51 | $-1.17 \times 10^{-8}$ |
| 1050 | 350 | 5092 | 0.20 | $1.97 \times 10^{-8}$ |
| 1200 | 400 | 3935 | 0.09 | $7.81 \times 10^{-9}$ |
| 1350 | 450 | 3130 | 0.0448 | $-8.5 \times 10^{-9}$ |
| 1500 | 500 | 2547 | $2.38 \times 10^{-2}$ | $-1.73 \times 10^{-8}$ |
| 2250 | 750 | 1144 | $2.09 \times 10^{-3}$ | $1.04 \times 10^{-8}$ |
| 3000 | 1000 | 646 | $3.72 \times 10^{-4}$ | $-6.67 \times 10^{-8}$ |

Table 1 shows an example of results for pure coning motion. In this case, the tilt angle $\Phi$ is 2 degrees and the coning frequency is 50 cycles per second. The first column shows various values of measurement frequency, which is the frequency of the data that is processed. The second column is the update frequency, or frequency that the attitude is updated. It takes three measurements to produce one update, so the frequency is one third of the measurement frequency.

The third column is the uncompensated drift rate about the coning axis. The fourth column is the drift rate after applying a three data point coning correction algorithm. The fifth column is the drift rate for the method carried out by module 130. Since this case is pure coning motion, the method has no error. The error shown in the fifth column is due to numerical processing error in implementing the test case and proposed method.

In another embodiment, attitude update module 130 can also be applied to time varying coning motion. For example, the vehicle attitude can be defined by the Euler rotation vector $\theta(t)$ given by $$\theta(t) = \begin{pmatrix} \theta\cos(vt)\sin(\alpha t) \\ \phi\cos(vt)\cos(\alpha t) \\ 0 \end{pmatrix} \quad (35)$$

Equation (35) represents coning motion with the amplitude oscillating at angular frequency $v$. The corresponding angular rate $\omega$ can be found using equation (36), where $\theta$ is the Euler rotation vector defining vehicle attitude.

$$\omega = \dot{\theta} - \frac{[1-\cos(\theta)]}{\theta^2}(\theta \times \dot{\theta}) + \frac{[\theta-\sin(\theta)]}{\theta^3}[\theta \times (\theta \times \dot{\theta})] \quad (36)$$

Using equations (35) and (36), the angular rate $\omega$ can be derived by $$\omega = \begin{pmatrix} -\dot\phi v \sin(vt)\sin(\alpha t) + \alpha \sin(\phi\cos(vt))\cos(\alpha t) \\ -\dot\phi v \sin(vt)\cos(\alpha t) - \alpha \sin(\phi\cos(vt))\sin(\alpha t) \\ \alpha(1 - \cos(\phi\cos(vt))) \end{pmatrix} \quad (37)$$

If the angular frequency v is 0, the equation (37) reduces to equation (32), as expected. Euler rotation vectors and angular rates can be generated by equations (35) and (37). The method described herein can be applied using angular rate data given by equation (37) with the tilt angle φ being 2 degrees and the slew rate α being 360 degrees per second. The coordinate transformation method can be used to obtain the slew rate of the angular rate vector. The attitude can be propagated based on equations (14) and (4). The resulting attitude error can be determined by comparing the data given by equation (33).

Figure 3:
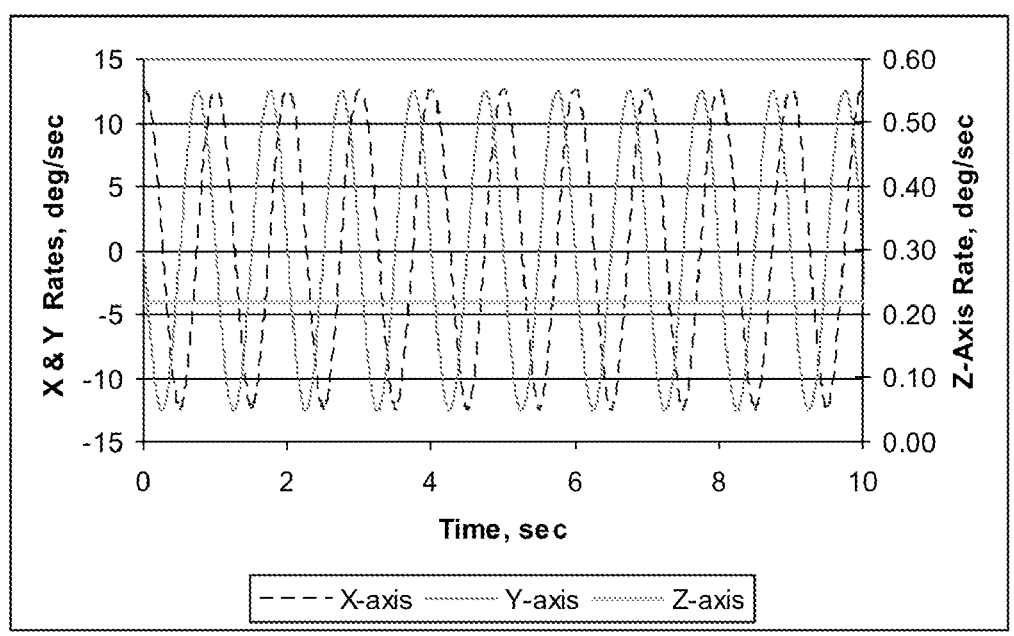
FIG. 3 illustrates a graph that shows angular rates of pure coning motion, in accordance with an embodiment of the present invention.
Figure 4:
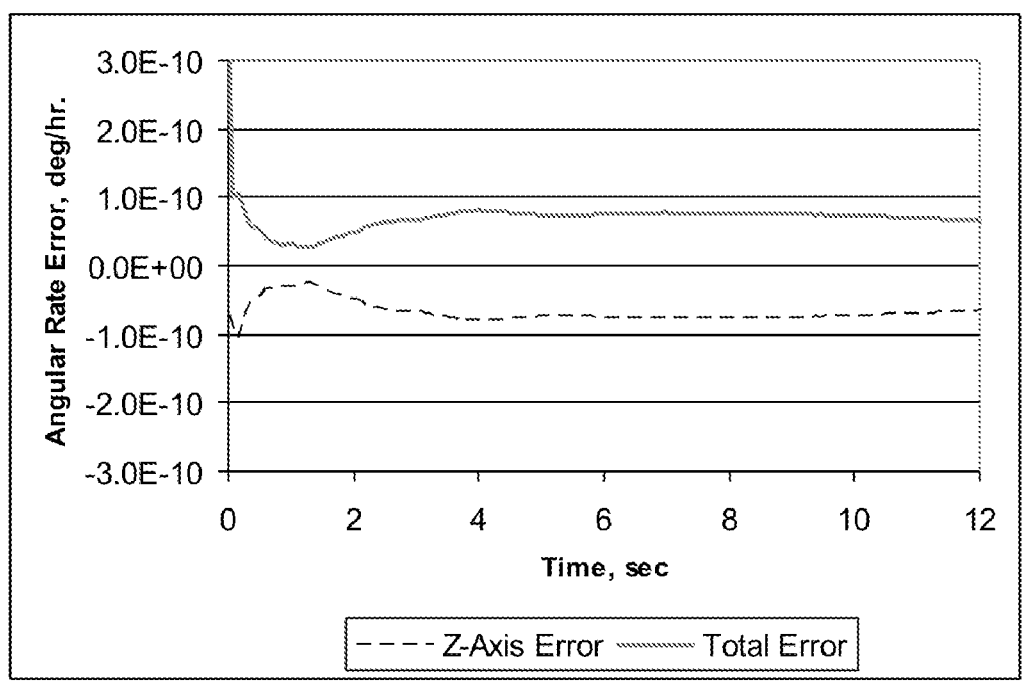
FIG. 4 illustrates a graph that shows an attitude error and z-axis drift rate error using the angular rates from FIG. 3 with a data rate of 120 Hz, in accordance with an embodiment of the present invention.

FIG. 3 illustrates a graph 300 that shows angular rates of pure coning motion, in accordance with an embodiment of the present invention. FIG. 4 illustrates a graph 400 that shows an attitude error and z-axis drift rate error using the angular rates from FIG. 3 with a data rate of 120 Hz, in accordance with an embodiment of the present invention. In other words, FIGS. 3 and 4 illustrate the angular rates and attitude error for the case of angular frequency v being 0 using a data rate of 120 Hz. As expected, the attitude error is essentially zero, with only numerical processing errors.

Figure 5:
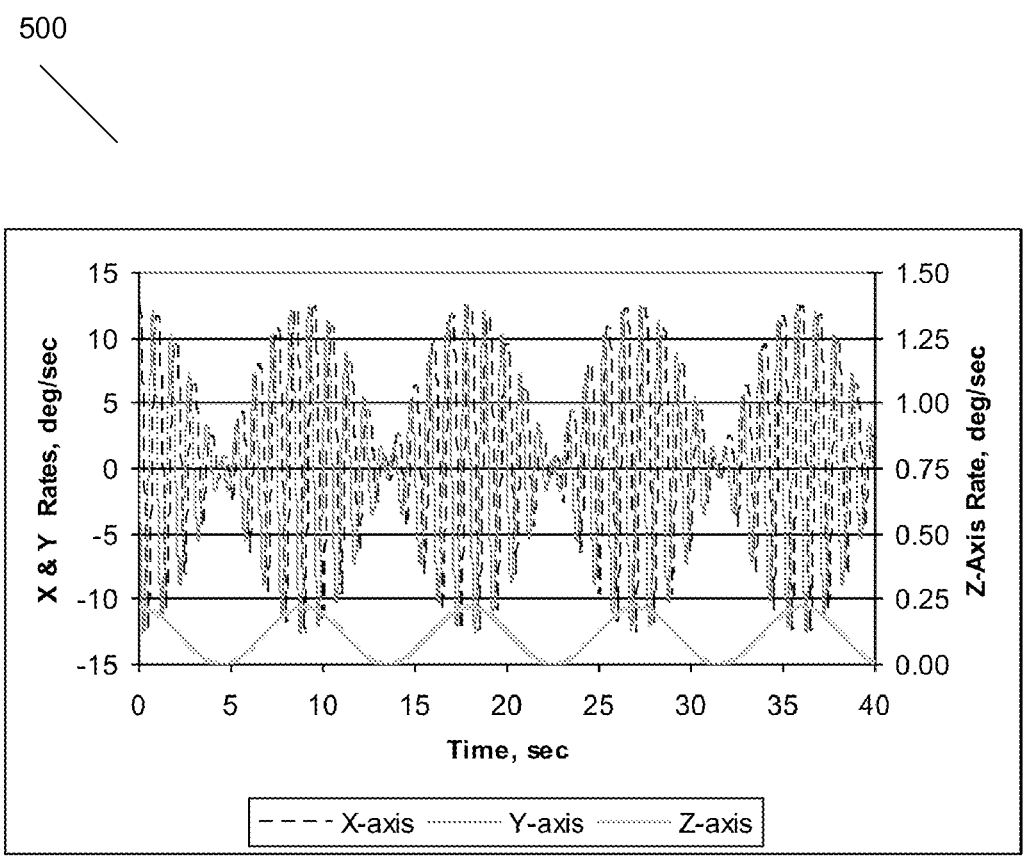
FIG. 5 illustrates a graph that shows angular rates given by equation (34) where v is 20 degrees per second, in accordance with an embodiment of the present invention.

FIG. 5 illustrates a graph 500 that shows angular rates given by equation (37) with angular frequency v being 20 degrees per second, in accordance with an embodiment of the present invention. In this embodiment, FIG. 5 illustrates results for angular frequency v being 20 degrees per second with a data frequency of 120 Hz. Because this case is for time varying coning motion, the magnitude of the angular rate in FIG. 5 varies as expected. The slew rate can be obtained using the coordinate transformation method, which assumes that the slew rate is constant. Since the slew rate changes, a small error is generated.

Figure 6:
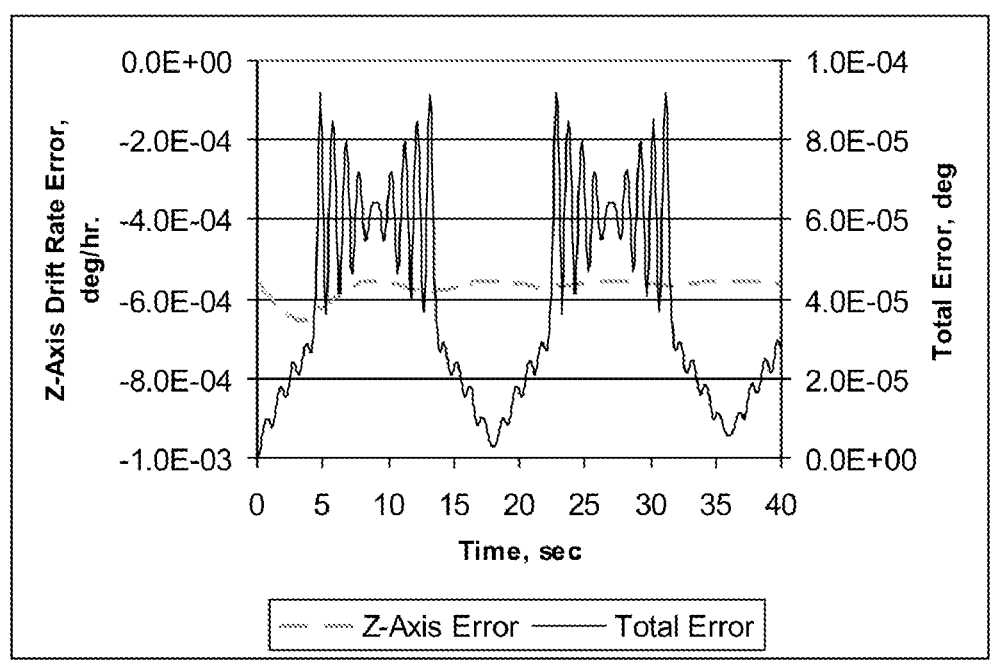
FIG. 6 illustrates a graph that shows an attitude error and z-axis drift rate error using angular rates from FIG. 5 with a data rate of 120 Hz, in accordance with an embodiment of the present invention.

FIG. 6 illustrates a graph 600 that shows an attitude error and z-axis drift rate error using angular rates from FIG. 5 with a data rate of 120 Hz, in accordance with an embodiment of the present invention. In this embodiment, FIG. 6 illustrates results for angular frequency v being 20 degrees per second with a data frequency of 120 Hz. FIG. 6 also shows the attitude drift rate about the z-axis and the absolute magnitude of the total error at the associated time. This embodiment illustrates that the algorithm can be applied to other cases than pure coning motion. However, it should be appreciated that in the other cases that attitude error can be generated since the magnitude of the angular rate and the slew rate of the angular rate are not constant. Nevertheless, the error, which is in the range of $1.0\times10^{-3}$ degrees per hour, is small and may be acceptable for some applications.

Figure 7:
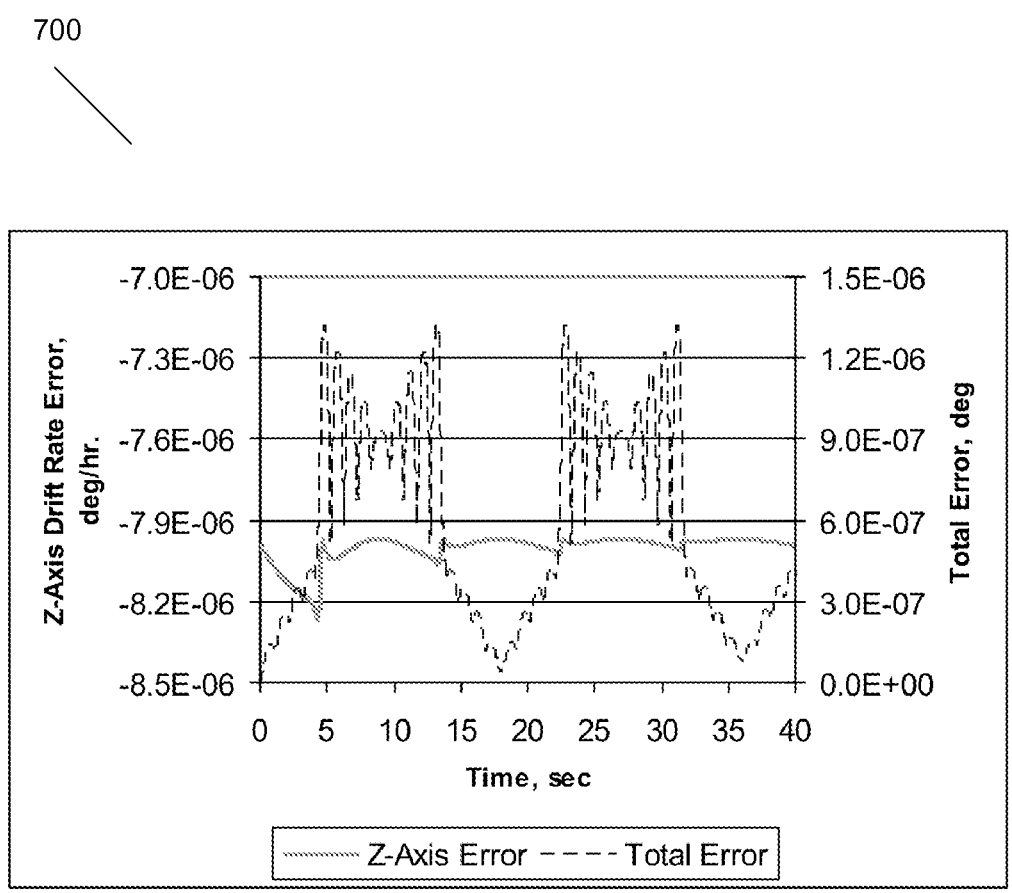
FIG. 7 illustrates a graph that shows an attitude error and z-axis drift rate error using the angular rates from FIG. 5 with a data rate of 1,000 Hz, in accordance with another embodiment of the present invention.

FIG. 7 illustrates a graph 700 that shows an attitude error and z-axis drift rate error using the angular rates from FIG. 5 with a data rate of 1,000 Hz, in accordance with another embodiment of the present invention. In this embodiment, FIG. 7 illustrates that the higher the frequency, the lower the associated attitude error, because the angular rate magnitude and the slew rates are closer to constant over each shorter time step. As a result, the z-axis drift rate error is reduced to approximately $1.6\times10^{-5}$ degrees per hour.

Figure 8:
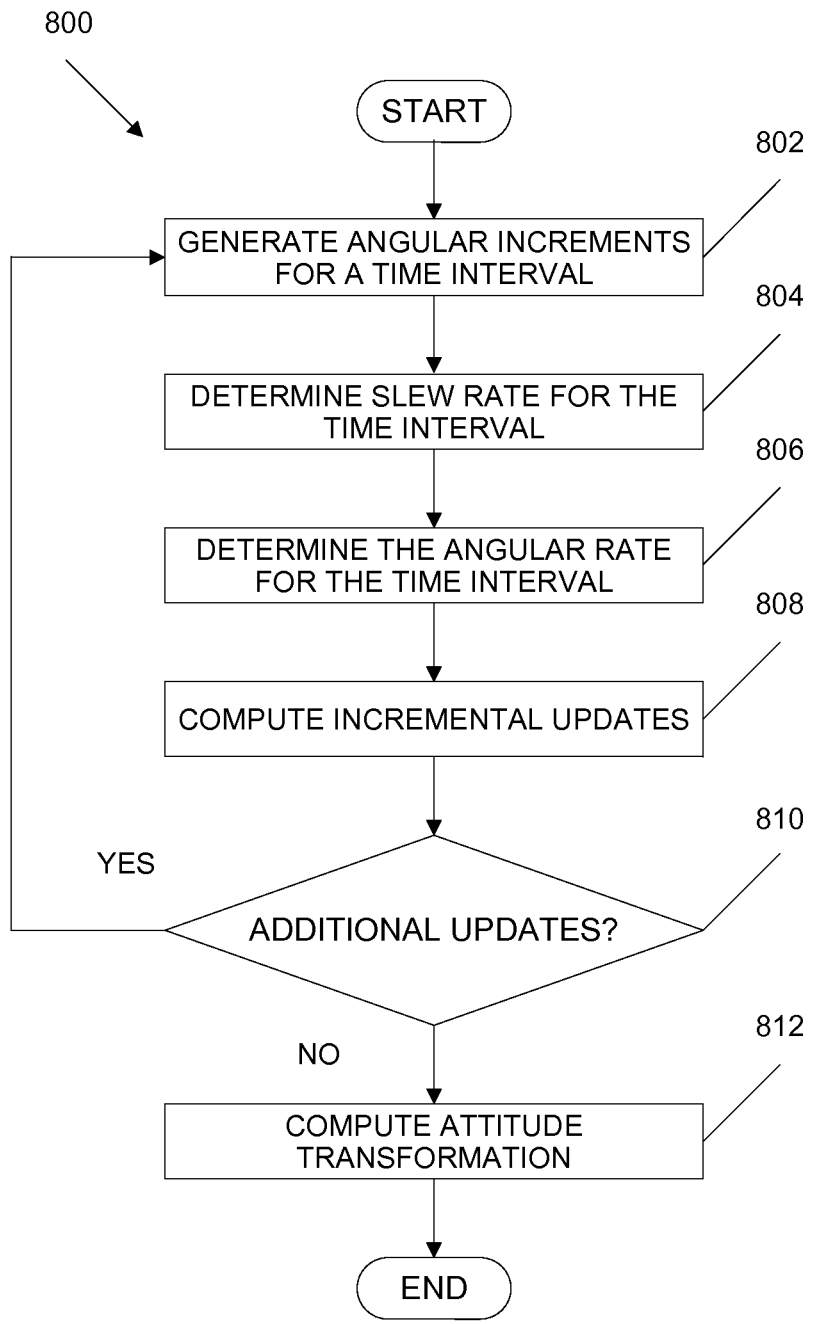
FIG. 8 illustrates a method for propagating the attitude of a vehicle, in accordance with an embodiment of the present invention.

FIG. 8 illustrates a method 800 for propagating the attitude of a vehicle, in accordance with an embodiment of the present invention. Attitude update module 130, or any module shown in FIG. 1, may carry out the method or cause processor 110 to perform the method as shown in FIG. 8. At 802, the angular increment $\Delta\theta_i$ is generated for a time interval (or time step).

At 804, the slew rate $\alpha_i$ for the time interval is determined based on the angular increment $\Delta\theta_i$. Based on the angular increment $\Delta\theta_i$ and the slew rate $\alpha_i$ for the time interval, angular rate $\omega_i$ is determined at 806.

At 808, the incremental updates for the time interval $\Delta U_i$ are computed using the slew rate $\alpha_i$ and the angular rate $\omega_i$ for the particular time interval, as shown in $$\Delta U_i = U[\omega_i + \alpha_i)\Delta t_i]U(-\alpha_i\Delta t_i) \quad (38)$$

At 810, module 130 or processor 110 determines whether additional attitude updates are required. If yes, then steps 802 to 808 are performed again. If no, then at 812 the attitude is propagated using the incremental updates shown in equation (29) or $$U = U_0 \Delta U_1 \Delta U_2 \Delta U_3 \Delta U_4 \Delta U_5 \ldots \Delta U_n \quad (39)$$

In other words, to obtain the attitude transformation U at any point in time, the initial transformation $U_0$ is multiplied by the incremental updates $U_1$ to $U_n$.

Figure 9:
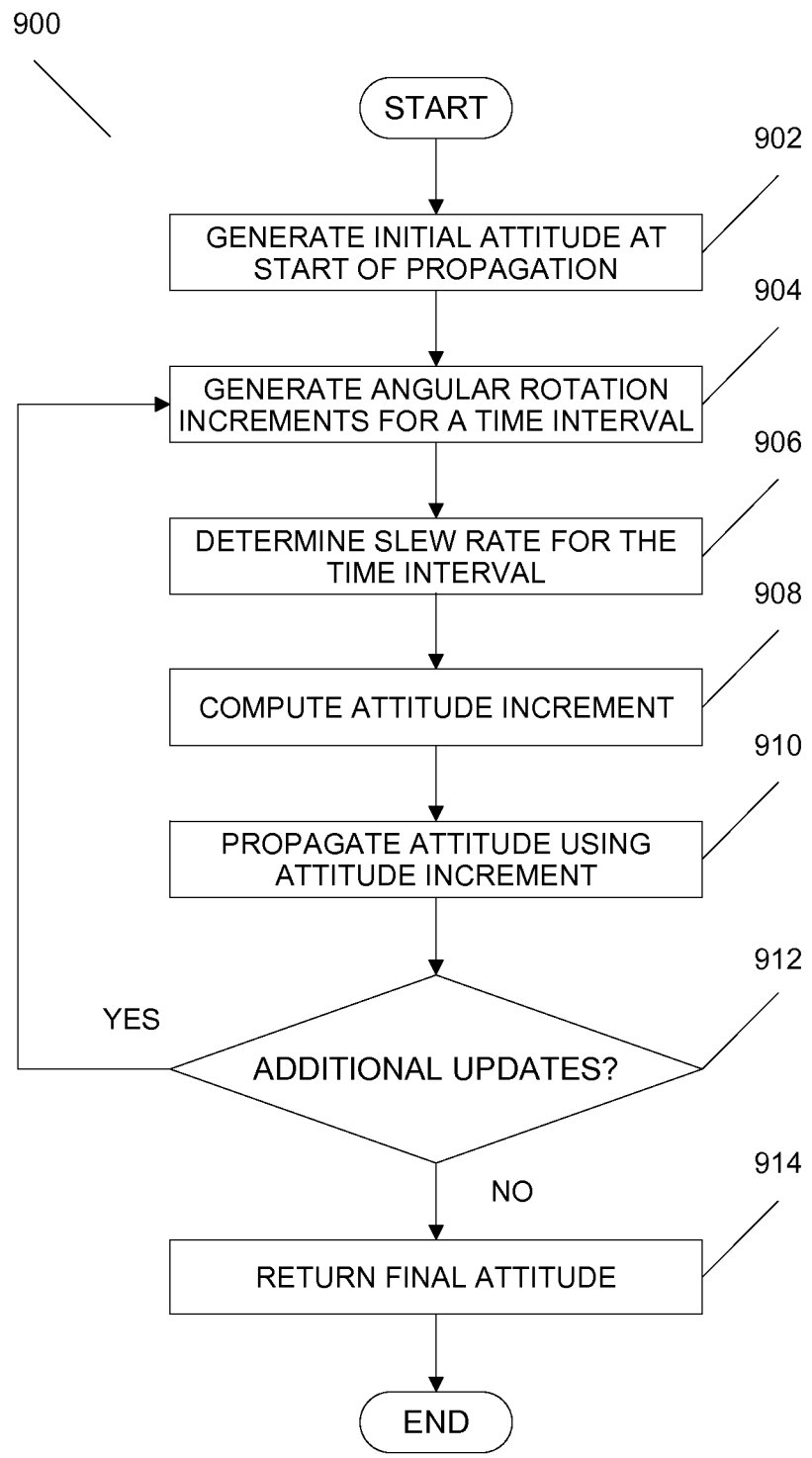
FIG. 9 illustrates a method for propagating the attitude of a vehicle, in accordance with an embodiment of the present invention.

FIG. 9 illustrates a method for propagating the attitude of a vehicle, in accordance with an embodiment of the present invention. Attitude update module 130, or any module shown in FIG. 1, may carry out the method or cause processor 110 to carry out the method shown in FIG. 9.

At 902, the initial attitude at the start of the propagation is determined and, at 904, the inertial navigation unit(s) generate the angular rotation increments for a time interval. At 906, the angular rotation increments are used to estimate or determine the slew rate. At 908, using the algorithm described above, the attitude increment is computed based on the angular rotation increment and the slew rate for the time interval. In some embodiments, the slew rate is used to obtain the angular rate vector at the beginning of each time step. At 910, based on the initial attitude at the start of propagation and the computed attitude increment, the attitude is propagated by module 130 or processor 110. At 912, a determination is made as to whether additional updates are needed. If additional updates are needed, then 904-910 are repeated. If additional updates are not needed, then at 914 the final attitude is returned to the system.

The method steps shown in FIGS. 8 and 9 may be performed, in part, by a computer program, encoding instructions for a nonlinear adaptive processor to cause at least the methods described in FIGS. 8 and 9 to be performed by the apparatuses discussed herein. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the method described in FIGS. 8 and 9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

The embodiments described above use an output of incremental rotation vectors from an inertial navigation unit to compute the slew rate of the angular rate vector. The attitudes are propagated using the output of the incremental rotation vectors and the computed slew rate of the angular rate vector. As a result, the attitude of the vehicle can be propagated without error for the case of pure coning motion using the output of incremental rotation vectors from the inertial navigation unit.

The embodiments described herein also provide a more accurate attitude propagation method and/or algorithm for vehicles. The apparatus and method described herein replaces the "coning correction algorithm" currently used in IMU's to compensate for slewing or "coning" angular rate vectors. Inertial navigation units for launch vehicles are more accurate, thereby enabling satellites to be injected into mission orbits more accurately. Since that attitude drift rate would be greatly reduced, IMU's could be used on much longer duration missions with improved accuracy.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
computing, by a processor, a slew rate based on angular rotation increments associated with a time interval t;
computing, by the processor, an incremental update for the time interval t based on an angular rate and the slew rate; and
propagating, by the processor, an attitude of a vehicle based on a computed attitude increment and an initial attitude at start of propagation to eliminate error for pure coning motion.

2. The computer-implemented method of claim 1, comprising:
generating, by the processor, angular rotation increments for a time interval t in order to determine the slew rate for the associated time interval t.

3. The computer-implemented method of claim 2, wherein the determining of the slew rate comprises:
performing, by a processor a coordinate transformation in order to determine the slew rate,
wherein the performing of the coordinate transformation comprises using, by the processor, three angular rotation increments in order to determine the slew rate for the associated time interval t.

4. The computer-implemented method of claim 1, wherein determining the angular rate for the associated time interval t comprises:
adjusting, by the processor, a magnitude for an angular rate vector; and
rotating, by the processor, the vector by an angle that is half of an angular rotation $\alpha \Delta t/2$.

5. The computer-implemented method of claim 1, further comprising:
transforming, by the processor, a vector in a vehicle frame to a vector in a slewing frame via a coordinate rotation as given by $X_S = U^{-1}(\alpha t) X = U(-\alpha t) X$, where X is the vector in the vehicle frame, $X_S$ is the vector in the slewing frame, $U^{-1}(\alpha t)$ is an inverse transformation matrix of the slew rate at the associated time interval t, $U(-\alpha t)$ is the transformation matrix of the slew rate at the associated time interval t, and $\alpha$ is the slew rate of an angular rate vector at the associated time interval t.

6. The computer-implemented method of claim 5, further comprising:
transforming, by the processor, the vector in the slewing frame to a vector in the inertial frame as given by $X_I = U[\omega(0)t + \alpha t] X_S$, where $X_I$ is a vector in an inertial frame, $X_S$ is the vector in the slewing frame, $U[\omega(0)t, +\alpha t]$ is a transformation of the angular rate and the slew rate at the associated time interval t, $\omega(0)$ is the initial angular rate in the vehicle frame at the associated time interval t, and $\alpha$ is the slew rate in the vehicle frame at the associated time interval t.

7. The computer implemented method of claim 1, wherein the computing of the incremental update is given by $\Delta U_i = U[\omega_i + \alpha_i)\Delta t_i] U(-\alpha_i \Delta t_i)$, where $U(-\alpha_i \Delta t_i)$ is to transform a vector in a vehicle frame to a vector in a slewing frame for an associated time interval t and $U[\omega_i + \alpha_i)\Delta t_i]$ is to transform a vector in the slewing frame to a vector in an inertial frame for the associated time interval t.

8. The computer-implemented method of claim 1, wherein the propagating of the attitude comprises:
computing, by the processor, a total transformation up to a current time as given by $U_T = \Delta U_1 \Delta U_2 \ldots \Delta U_N$, where U is a transformation matrix for each associated time interval t.

9. An apparatus, comprising:
a processor; and
memory comprising instructions,
wherein the instructions are configured to cause the processor to:
compute a slew rate based on angular rotation increments associated with a time interval t;
compute an incremental update for the time interval t based on an angular rate and the slew rate; and
propagate an attitude of a vehicle based on a computed attitude increment and an initial attitude at start of propagation to eliminate error for pure coning motion.

10. The apparatus of claim 9, wherein the instructions are further configured to cause the processor to generate angular rotation increments for a time interval t in order to determine the slew rate for the associated time interval t.

11. The apparatus of claim 10, wherein the instructions are further configured to cause the processor to determine the slew rate by performing a coordinate transformation using three angular rotation increments in order to determine the slew rate for the associated time interval t.

12. The apparatus of claim 9, wherein the instructions are further configured to cause the processor to determine the angular rate for the associated time interval t based on an adjustment of a magnitude for an angular rate vector, and a rotation to the angular rate vector by an angle that is half of an angular rotation $\alpha \Delta t/2$.

13. The apparatus of claim 9, wherein the instructions are further configured to cause the processor to:
transform a vector in a vehicle frame to a vector in a slewing frame via a coordinate rotation as given by $X_S = U^{-1}(\alpha t) X = U(-\alpha t) X$, where X is the vector in the vehicle frame, $X_S$ is the vector in the slewing frame, $U^{-1}(\alpha t)$ is an inverse transformation matrix of the slew rate at the associated time interval t, $U(-\alpha t)$ is the transformation matrix of the slew rate at the associated time interval t, $\alpha$ is the slew rate of an angular rate vector at the associated time interval t.

14. The apparatus of claim 13, wherein the instructions are further configured to cause the processor to:
transform the vector in the slewing frame to a vector in the inertial frame as given by $X_I = U[\omega(0)t + \alpha t] X_S$, where $X_I$ is the vector in an inertial frame, $X_S$ is the vector in the slewing frame, $U[\omega(0)t+\alpha t]$ is a transformation for the angular rate and the slew rate at the associated time interval t, $\omega(0)$ is the angular rate in the vehicle frame at the associated time interval t, and $\alpha$ is the slew rate in the vehicle frame at the associated time interval t.

15. The apparatus of claim 9, wherein the instructions are further configured to cause the processor to compute the incremental update as given by $\Delta U_i = U[\omega_i + \alpha_i)\Delta t_i]U(-\alpha_i\Delta t_i)$, where $U(-\alpha_i\Delta t_i)$ is a transformation of a vector in a vehicle frame to a vector in a slewing frame for an associated time interval t and $U[\omega_i+\alpha_i)\Delta t_i]$ is a transformation of a vector in the slewing frame to a vector in an inertial frame for the associated time interval t.

16. The apparatus of claim 9, wherein the instructions are further configured to cause the processor to propagate the attitude based on a computation of a total transformation up to a current time as given by $U_t = \Delta U_1 \Delta U_2 \ldots \Delta U_N$, where U is a transformation matrix for each associated time interval t.

17. A computer program embodied on a non-transitory computer-readable medium, the computer program, when executed, is configured to cause a processor to:
compute a slew rate based on angular rotation increments associated with a time interval t;
compute an incremental update for the time interval t based on an angular rate and the slew rate; and
propagate an attitude of a vehicle based on a computed attitude increment and an initial attitude at start of propagation to eliminate error for pure coning motion.

18. The computer program of claim 17, wherein the computer program is further configured to cause the processor to:
generate angular rotation increments for a time interval t in order to determine the slew rate for the associated time interval t.

19. The computer program of claim 18, wherein the computer program is further configured to cause the processor to determine the slew rate based on a coordinate transformation using three angular rotation increments in order to determine the slew rate for the associated time interval t.

20. The computer program of claim 17, wherein the computer program is further configured to cause the processor to determine the angular rate for the associated time interval t based on an adjustment to a magnitude for an angular rate vector, and a rotation to the vector by an angle that is half of an angular rotation $\alpha\Delta t/2$.

* * * * *